(12) United States Patent
Strasser (10) Patent No.: US 6,986,494 B2
(45) Date of Patent: Jan. 17, 2006

(54) SELF-ALIGNING MOUNTING BRACKET AND SYSTEM FOR MOUNTING A PLANAR STRUCTURE TO A FIXED STRUCTURE

(75) Inventor: Daniel G. Strasser, Calgary (CA)

(73) Assignee: Dyneter Industries Ltd., Calgary (CA)

( * ) Notice: Subject to any disclaimer, the term of this patent is extended or adjusted under 35 U.S.C. 154(b) by 25 days.

(21) Appl. No.: 10/438,122

(22) Filed: May 15, 2003

(65) Prior Publication Data

US 2004/0227038 A1    Nov. 18, 2004

(51) Int. Cl.
*B60K 15/03*    (2006.01)
*B60P 3/22*     (2006.01)

(52) U.S. Cl. ............... 248/500; 248/689; 220/4.14; 180/314; 280/834; 137/267

(58) Field of Classification Search ............ 248/74.1, 248/230.9, 689, 73, 74.4, 500, 505, 74.5; 180/314, 69.5; 280/834; 137/267; 220/4.14, 220/481
See application file for complete search history.

(56) References Cited

U.S. PATENT DOCUMENTS

| | | | | |
|---|---|---|---|---|
| 429,357 | A * | 6/1890 | McBee ................. | 248/68.1 |
| 2,440,469 | A * | 4/1948 | Goddard .............. | 248/68.1 |
| 3,146,982 | A * | 9/1964 | Budnick .............. | 248/68.1 |
| 3,556,447 | A * | 1/1971 | Jenkins et al. ....... | 248/62 |
| 3,576,305 | A * | 4/1971 | Welsh et al. ......... | 248/68.1 |
| 3,981,107 | A | 9/1976 | Schubach | |
| 4,322,192 | A | 3/1982 | Zavada et al. | |
| 4,358,914 | A | 11/1982 | Geyer | |
| 4,765,757 | A | 8/1988 | Hartl | |
| 4,834,448 | A | 5/1989 | Sakamoto et al. | |
| 5,054,799 | A | 10/1991 | Fingerle | |
| 5,131,459 | A | 7/1992 | Thompson et al. | |
| 5,284,267 | A * | 2/1994 | Polletta et al. ....... | 220/4.14 |
| 5,464,140 | A | 11/1995 | Hill | |
| 5,548,939 | A | 8/1996 | Carmical | |
| 5,558,369 | A | 9/1996 | Cornea et al. | |
| 5,590,966 | A | 1/1997 | Cherny et al. | |
| 5,704,749 | A | 1/1998 | Landgrebe | |
| 5,725,273 | A | 3/1998 | Vernon et al. | |

(Continued)

FOREIGN PATENT DOCUMENTS

DE    10306872 A1 * 10/2003

(Continued)

OTHER PUBLICATIONS http://www.hydrdogen.org/fcbus/ebus.html, Jan. 16, 2003, 2 pages.

*Primary Examiner*—Anita M. King
(74) *Attorney, Agent, or Firm*—Sean W. Goodwin; Linda M. Thompson (57) ABSTRACT

A self-aligning bracket for use in mounting a planar surface such as a roof to a fixed structure such as a bank of fuel cylinders mounted to the roof of a vehicle frame. The bracket provides a locating block on a saddle mount which co-operates with a depression formed on the inner surface of the roof to align fasteners depending from the roof with a coupling fastener on the bracket. The coupling fastener is laterally moveable within an oversized hole in the bracket and engages the locating block to permit co-rotation. An anchor is attached to an end of the coupling fastener so that when the roof fastener is actuated in the coupling fastener, the anchor is drawn towards the coupling fastener, tightening the locating block, coupling fastener and anchor to the saddle mount, preventing further lateral movement.

31 Claims, 7 Drawing Sheets

U.S. PATENT DOCUMENTS

| | | | |
|---|---|---|---|
| 5,810,309 A * | 9/1998 | Augustine et al. | 248/313 |
| 5,887,939 A | 3/1999 | Yamaguchi et al. | |
| 6,042,071 A * | 3/2000 | Watanabe et al. | 248/313 |
| 6,065,915 A | 5/2000 | Ruehl et al. | |
| 6,070,383 A | 6/2000 | Jeanseau | |
| 6,105,332 A | 8/2000 | Boyadjian | |
| 6,135,535 A | 10/2000 | Tarahomi | |
| 6,257,360 B1 | 7/2001 | Wozniak et al. | |
| 6,318,672 B1 | 11/2001 | Traylor | |
| 6,331,026 B1 | 12/2001 | Adsit et al. | |
| 6,367,871 B2 | 4/2002 | Grimm et al. | |
| 6,375,249 B1 | 4/2002 | Stanton et al. | |
| 6,412,588 B1 | 7/2002 | Scott et al. | |
| 6,416,265 B1 | 7/2002 | Flores et al. | |

FOREIGN PATENT DOCUMENTS

| | | | |
|---|---|---|---|
| JP | 62-024049 | | 7/1985 |
| JP | 62-024050 | | 2/1987 |
| JP | 62-200980 | | 1/1993 |
| JP | 07-117496 | | 10/1993 |
| JP | 07-223447 | | 2/1994 |
| JP | 2000190874 A | * | 7/2000 |
| JP | 2000-225855 | | 8/2000 |
| JP | 2001-239845 | | 9/2001 |

* cited by examiner

SELF-ALIGNING MOUNTING BRACKET AND SYSTEM FOR MOUNTING A PLANAR STRUCTURE TO A FIXED STRUCTURE

FIELD OF THE INVENTION

The invention relates to fastening devices for affixing one planar surface over another surface and more particularly to self-aligning fasteners for attaching a roof structure over a plurality of fuel cylinders mounted on the roof of a vehicle.

BACKGROUND OF THE INVENTION

Many alternate fuel vehicles, such as buses typically use fuels such as compressed natural gas (CNG), liquefied natural gas (LNG), or hydrogen fuel stored in relatively large fuel cylinders, to supply fuel for normal operation. The fuel cylinders are mounted to the frame of the vehicle and, particularly in the case of low floor buses, are mounted to the roof frame.

A challenge is thus presented to the bus manufacturer to attach the roof structure over the bank of cylinders and ensure that the roof is adequately secured to meet safety regulations. Due to the weight and overall dimensions, the roof is typically lifted by crane or other lifting device and placed on top of the frame, over the cylinders. If composite cylinders are used, the roof must be supported above the cylinders to prevent abrasion which may, over time, reduce the structural integrity of the cylinders.

Once positioned on the frame, the roof must be secured, the problem being that access is only available from the outside of the roof. Also problematic is the fact that pre-drilled holes in the roof carrying fasteners may not align perfectly with whatever receiving means is present on the frame. This can necessitate moving the large and unwieldy roof structure without damaging the roof or the underlying frame or cylinders or re-drilling holes so as to match the receiving means, which may mar the appearance of the roof.

U.S. Pat. No. 6,412,588 to Scott et al. teaches a roof or lid, formed in two pieces and attached at either end to the bus frame using hinges. The roof is supported, at the center where the two pieces join, by a post rising from the tank support. Systems, such as that taught by Scott, are complex and require moving parts, hinges, cables and the like. Further, should the roof be misaligned, gaps or overlap may result which spoil the aesthetics of the vehicle roof and may allow dirt and the like to enter the cylinder storage compartment.

Japanese patent JP 2000-225855 teaches a roof supported at either end by a triangular frame structure attached to the bus frame and at the periphery to the cylinder mounting frame. The addition of frame structures to support the roof adds considerably to the weight that must be supported on the bus frame.

Ideally, what is required is a lightweight system for mounting a roof to a frame of a vehicle. More particularly, the mounting system should be operable without access to the underside of the roof and should be adjustable to permit proper alignment of the roof with the frame.

SUMMARY OF THE INVENTION

A self-aligning bracket is provided which permits lateral movement of a connected and co-rotatable alignment means and coupling means to mate with a corresponding alignment means on the structure to be mounted and thus align a fastener depending from the structure to be engaged into the coupling means. Once aligned, actuation of the fastener causes an anchor on a first end of the coupling means to tighten the alignment means to the anchor and thereby prevent further lateral movement.

Use of a plurality of the self-aligning brackets is particularly useful in a system for mounting a roof to a vehicle frame on which a plurality of fuel cylinders have been previously mounted. Brackets are adapted for mounting to at least some of the fuel cylinders within a bank of cylinders. A plurality of corresponding alignment means and fasteners on the roof can mate with coupling means and corresponding alignment means on each of the brackets to engage the fasteners with the coupling means. Each bracket is capable of independently aligning with the corresponding alignment means to engage the corresponding fastener.

In one broad aspect of the invention, a self-aligning bracket is adapted for mounting a first planar structure, having a fastener extending from an inner surface, over a second fixed structure, the self-aligning bracket comprising:

a saddle mount having first and second ends adapted for attachment to the fixed structure, a planar alignment surface spaced above the fixed structure and an oversized hole formed in the planar alignment surface;

coupling means adapted for engaging the fastener extending from the first planar surface, the coupling means extending through the oversized hole in the planar mounting surface;

an anchor connected to a first end of the coupling means, the anchor acting to retain the coupling means in the oversized hole;

first alignment means positioned on an inner surface of the first planar structure adjacent the extending fastener; and second alignment means mounted over the oversized hole in the planar alignment surface of the saddle mount and moveable thereon and co-operating with the first alignment means;

wherein the coupling means is laterally moveable within the oversized hole to permit alignment of the first and second alignment means and actuation of the fastener within the coupling means causes the anchor and the second alignment means to co-rotate for tightening the first planar surface to the second fixed structure.

Preferably, the first alignment means is a depression formed on the inner surface of the first planar structure and the second alignment means is a frustoconical shaped locating block having a central bore through which the coupling means extends. The coupling means is a tubular fastener having an inner threaded bore for engaging a threaded fastener depending from the first planar surface. The tubular fastener extends through the oversized hole in the planar mounting surface of the saddle mount to engage the anchor, which may be an oversized washer. Preferably the washer and the second end of the tubular fastener are threaded for engagement.

Further, the tubular fastener has a shaped head for engaging a similarly shaped opening to the central bore of the locating block to permit co-rotation of the locating block and the tubular fastener in response to actuation of the fastener depending from the first planar surface. Co-rotation of the locating block and the tubular fastener causes the threaded washer to move toward the locating block, tightening both components against the planar mounting surface of the saddle mount thus preventing any further lateral movement of the locating block and the tubular fastener.

In a second broad aspect of the invention, a system adapted for mounting a planar roof structure to a vehicle frame having a plurality of fixed fuel cylinders mounted thereon is described, the system comprising:

a plurality of self-aligning brackets adapted for attachment to at least some of the fuel cylinders; and a plurality of corresponding fasteners and alignment means extending from an inner surface of the roof structure;

wherein each of the self-aligning brackets is capable of independently aligning with a corresponding alignment means on the roof and engaging a corresponding fastener therein.

Preferably, the system employs the self-aligning brackets of the present invention which are adapted for attachment to at least some of the plurality of fuel cylinders. The brackets are attached through belly mount straps which are connected to first and second ends of the saddle mount. More preferably, an arcuate base plate is attached to the saddle mount between the first and second ends to support the planar mounting surface of the saddle mount above the fuel cylinders.

In use, a roof of a vehicle is lowered onto the vehicle frame and each of the plurality of alignment means on the roof engage the corresponding alignment means on the fuel cylinders, the alignment means on the cylinders independently moving laterally to align the fasteners on the roof with the co-operating coupling means on the bracket. The fasteners are then actuated to tighten the roof to the cylinders and thus to the vehicle frame.

Preferably, brackets are attached to opposing ends of each cylinder. More preferably, the brackets are attached to the opposing ends of every other cylinder in a bank of cylinders.

Preferably, an elastomeric pad is positioned between the strap and the arcuate base plate to prevent corrosion or abrasion.

BRIEF DESCRIPTION OF THE DRAWINGS

FIGS. 6a and 6b are schematics of a roof mounting system using a plurality of brackets according to FIG. 4, particularly

DETAILED DESCRIPTION OF THE PREFERRED EMBODIMENT

Figure 1:
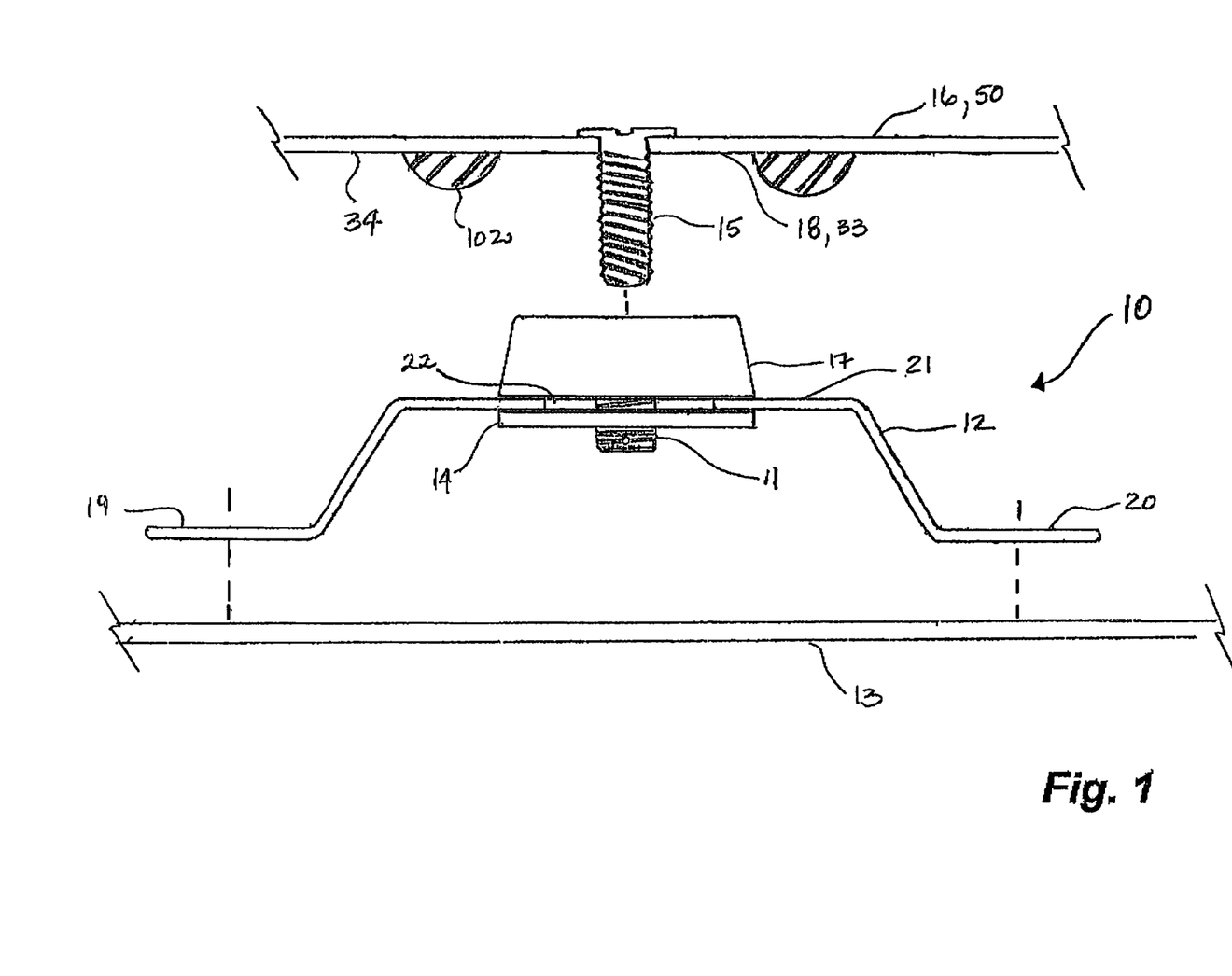
FIG. 1 is a side view of a bracket according to one embodiment of the invention.

As shown in FIG. 1, the bracket 10 comprises a coupling means 11 which is attached to and laterally moveable on a saddle mount 12. The saddle mount 12 is adapted for attachment to a fixed structure 13. The coupling means 11 is restricted from axial movement thereon by an anchor 14. The coupling means 11 engages a fastener 15 extending from a first planar structure 16 to be mounted on the fixed structure 13. Once coupled, the fastener 15 is actuated to cause the coupling means 11 and the anchor 14 to be drawn together for tightening to the saddle mount 12. Further, the bracket 10 comprises a second alignment means 17 which co-operates with a first alignment means 18 on the first planar structure 16 for aligning the fastener 15 with the coupling means 11.

In a preferred embodiment of the bracket 10, the saddle mount 12 is a shaped mounting structure having first and second ends 19,20 adapted for mounting to the fixed structure 13 and a central planar alignment surface 21 spaced or offset from the fixed structure 13. An oversized hole 22 is formed in the central planar alignment surface 21 for accepting the coupling means 11 and permitting lateral displacement of the coupling means 11 therein.

Figure 2:
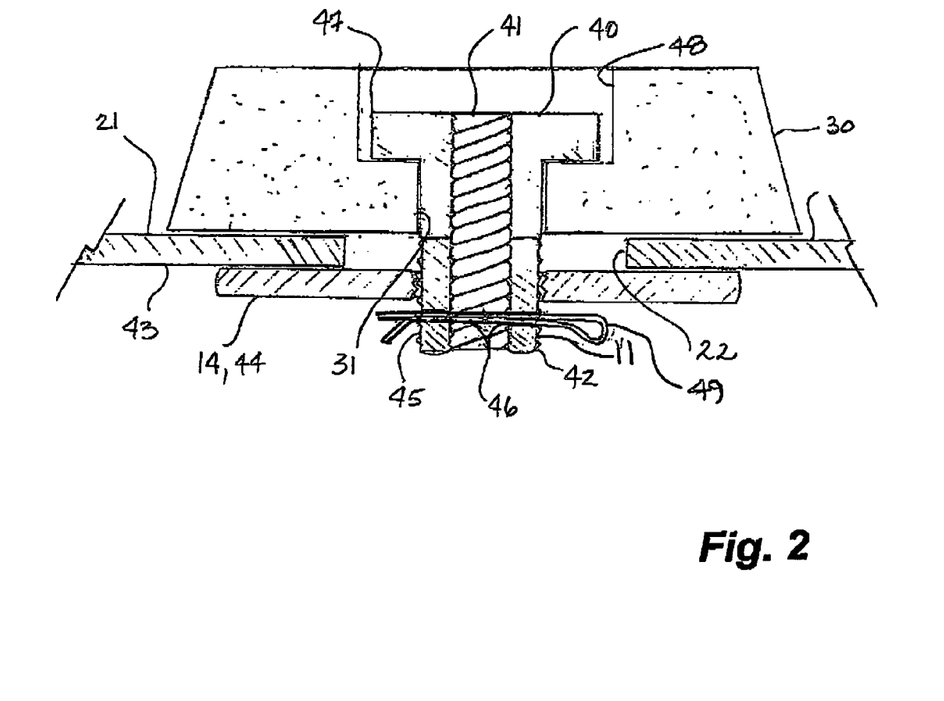
FIG. 2 is a section view illustrating the relationship between a locating cone, a coupling means, a planar alignment surface and an anchor according to FIG. 1.

Having reference to FIGS. 1 and 2, the second alignment means 17 is a frustoconical shaped locating block 30 positioned on the central planar alignment surface 21 and is connected thereto by the coupling means 11, which passes through a central bore 31 in the locating block 30 and through the oversized hole 22 in the alignment surface 21. The locating block 30 is permitted to move laterally about the alignment surface 21 as the coupling means 11 moves within the oversized hole 22. The shaped locating block 30 is complementary in shape to the first alignment means 18, preferably being a depression 33 formed on an inner surface 34 of the first planar structure 16. As the planar structure 16 is brought into close proximity with the fixed structure 13, the shaped locating block 30 is guided by the first alignment means 18 and therefore moves laterally within the oversized hole 22 until the locating block 30 aligns within the planar structure's depression 33. This is of particular importance when access to the adjacent bracket 10 and fastener 15 is blind, limited or not possible once the planar structure 16 is into close proximity with the fixed structure 13.

Preferably, the coupling means 11 comprises a tubular fastener 40 having an inner bore 41 which is threaded for engagement with the fastener 15, typically a threaded bolt, extending from the planar surface 16. A first end 42 of the tubular fastener 40 engages the anchor 14 on an opposing side 43 of the alignment surface 21. The anchor 14 is sized to span the oversized hole 22 and prevents axial movement of the tubular fastener 40 therefrom. The anchor 14 must be of sufficient dimension to continue to span the oversized hole 22 when the tubular fastener 40 is maximally displaced within the oversized hole 22.

Preferably, the anchor 14 is an oversized washer 44 being at least twice the diameter of the oversized hole 22 less the diameter of the tubular fastener 40. More preferably, the washer 44 is threaded and an outer surface 45 of the tubular fastener 40 is similarly threaded to permit engagement of the washer 44 and the tubular fastener 40. A hole 46 is transversely formed through the first end 42 of the tubular fastener 40 for accepting a cotter pin 49 which prevents unthreading of the washer 44 from the tubular fastener 40, once assembled.

Further, a second end 47 of the tubular fastener 40 is formed having a shaped head which co-operates with a shaped opening 48 to the bore 31 in the locating block 30 to permit co-rotation of the tubular fastener 40 and the locating block 30. As the threaded bolt 15, extending from the planar surface 16, engages the inner threaded bore 31 of the tubular fastener 40, the locating block 30 and tubular fastener 40 are caused to co-rotate, drawing the washer 44 toward the opposing side 43 of the alignment surface 21 until the alignment surface 21 is sandwiched tightly between the locating block 30 and the washer 44 preventing further lateral movement. Even if the washer 44 and the tubular fastener are not tightened, the washer 44 cannot pull free of the saddle mount 12.

In Use

Figure 3:
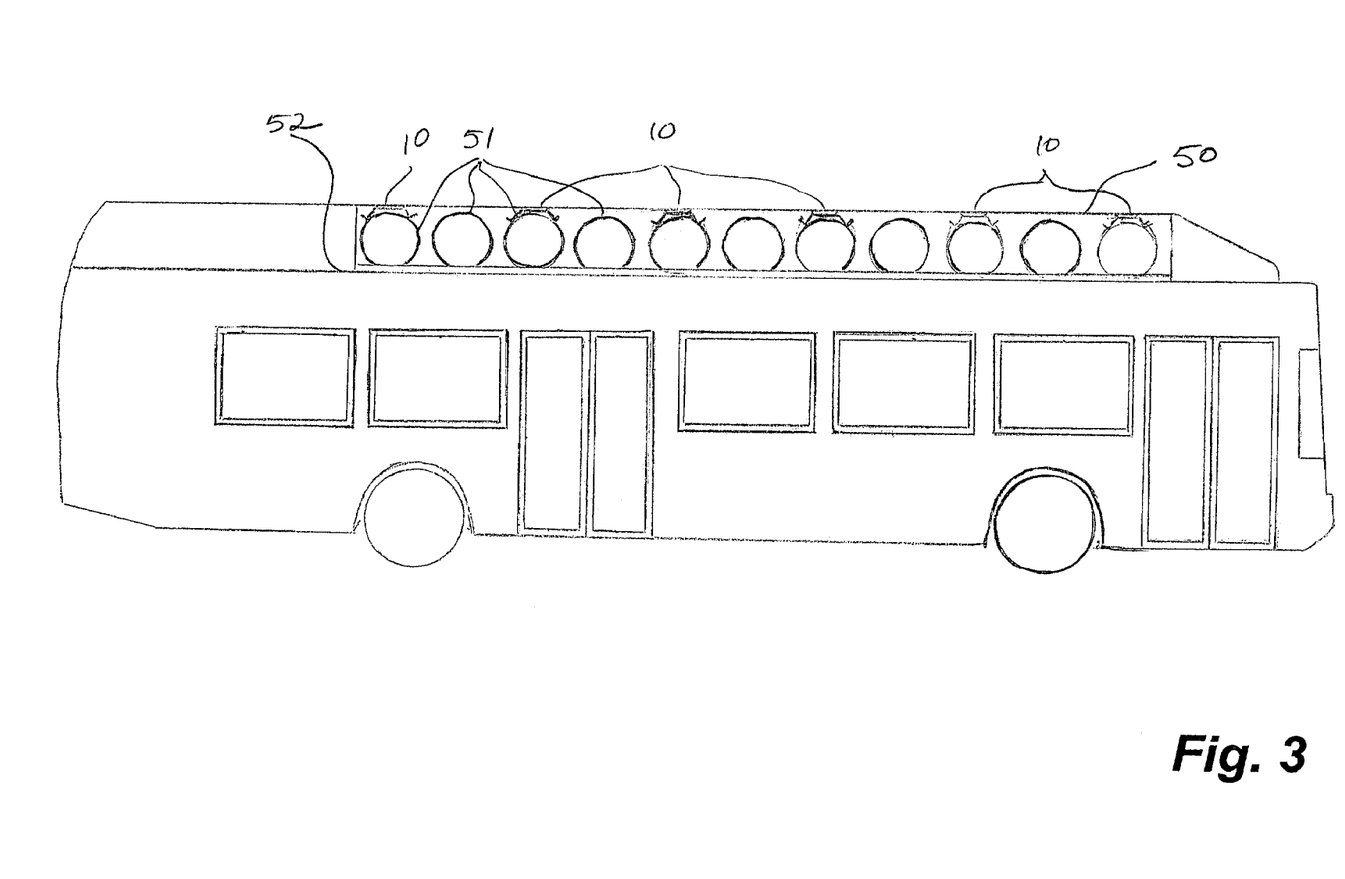
FIG. 3 is a side view of a bus having a bank of fuel cylinders mounted atop a frame and having a roof mounted to the fuel cylinders using a mounting system according to another embodiment of the invention.

As shown in FIG. 3, the bracket 10, as described above, is particularly suited to a system for mounting and fastening a vehicle roof, typically a roof 50 of a bus, over a plurality of fuel cylinders 51 mounted to the top of the bus frame 52.

As shown in FIGS. 1 and 4–7, and in a preferred embodiment of the system, a plurality of brackets 100 are affixed to at least some of the cylinders 51 mounted to the bus frame 52, typically by belly mount straps 101. Fasteners 15 extend through predrilled holes in the roof structure 50, each of the fasteners 15 being surrounded by a donut shaped fixture 102, stamped profile or the like, which creates a plurality of depressions 33 on the inner surface 34 of the roof 50. The roof 50 is lifted and lowered towards the bus frame 52 aligning the edges of the roof 50 with the frame 52. Once the roof 50 is in close proximity to the frame 52 and to the cylinders 51, direct access to the brackets 100 and the fasteners 15 is typically no longer possible. Having reference to FIG. 6a, as the locating blocks 30 on the brackets 100 engage the donut fixtures 102, any misaligned locating blocks 30 move laterally about the planar alignment surfaces 21, to align each of the locating blocks 30 into the corresponding depression 33 created by the donut fixtures 102. Once the roof 50 is properly aligned, the fasteners 15 can be screwed into the tubular fasteners 40 causing the threaded washers 44 and locating blocks 30 to be drawn together and tighten the roof 50 to the brackets 100 and to the bus frame 52. Thus, the roof 50 can be mounted and aligned properly both with the bus frame 52 and with the mounting brackets 100, having access to the outside of the roof alone. The cylinders 51 are protected from damage which might occur as a result of attempting to move the roof 50 structure to align each and every fastener 15.

Figure 4:
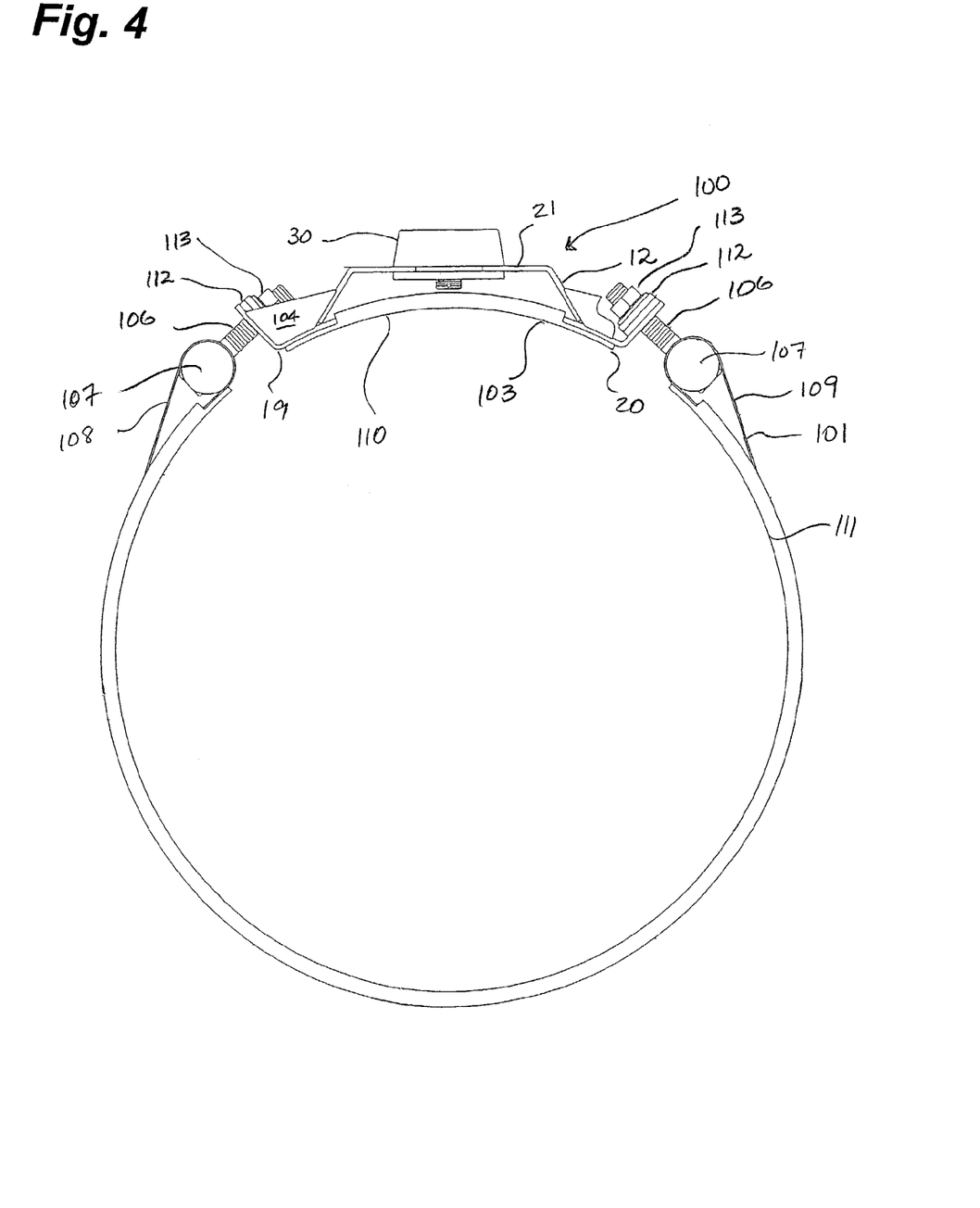
FIG. 4 is a side view according to another embodiment of the invention for use in a roof mounting system illustrating the connection of a bracket to a belly mount strap adapted for attachment to a fuel cylinder, the fuel cylinder having been removed for ease of viewing.
Figure 5:
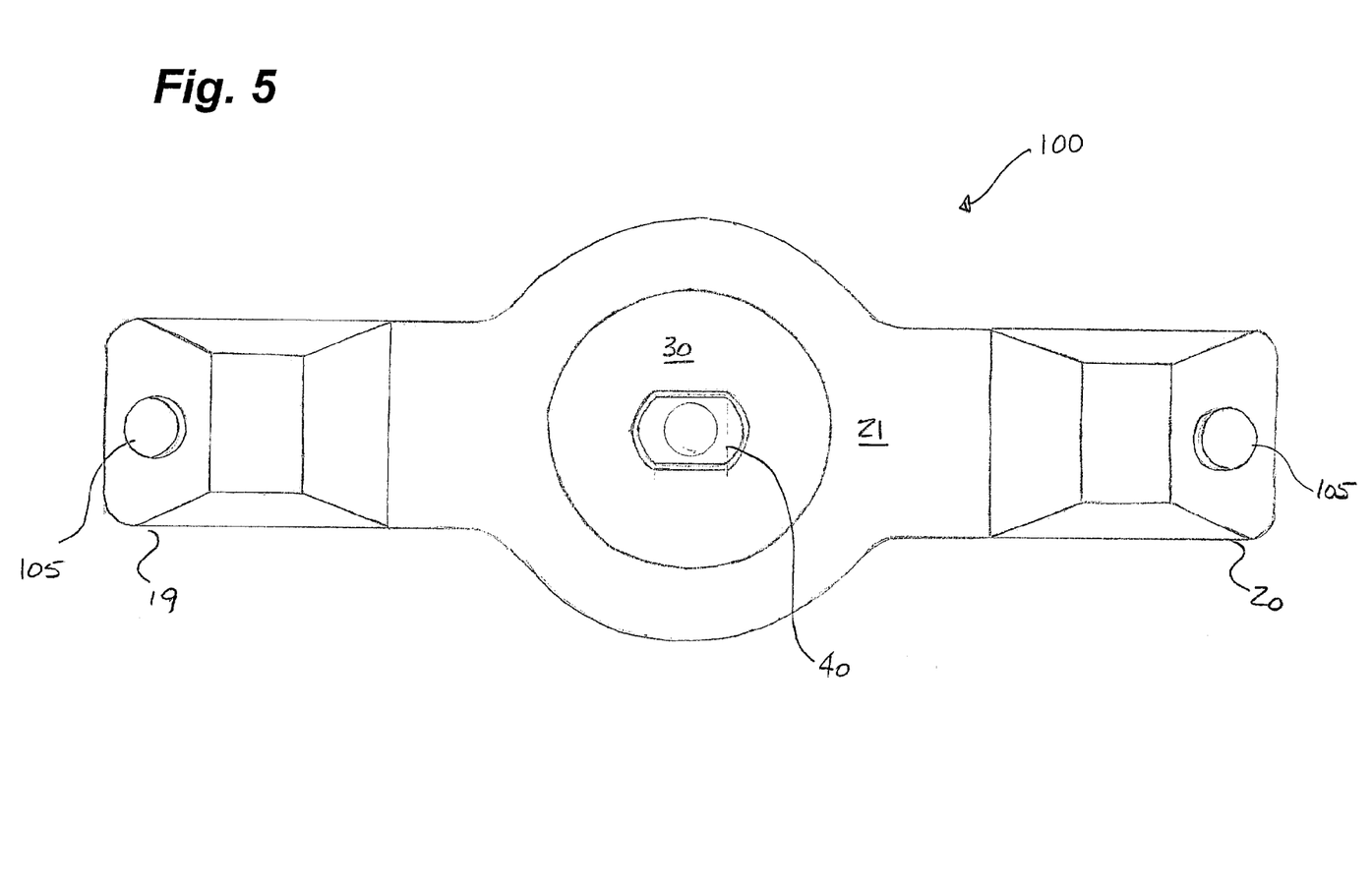
FIG. 5 is a plan view of a bracket according to FIG. 4 for use in a roof mounting system.
Figure 6A:
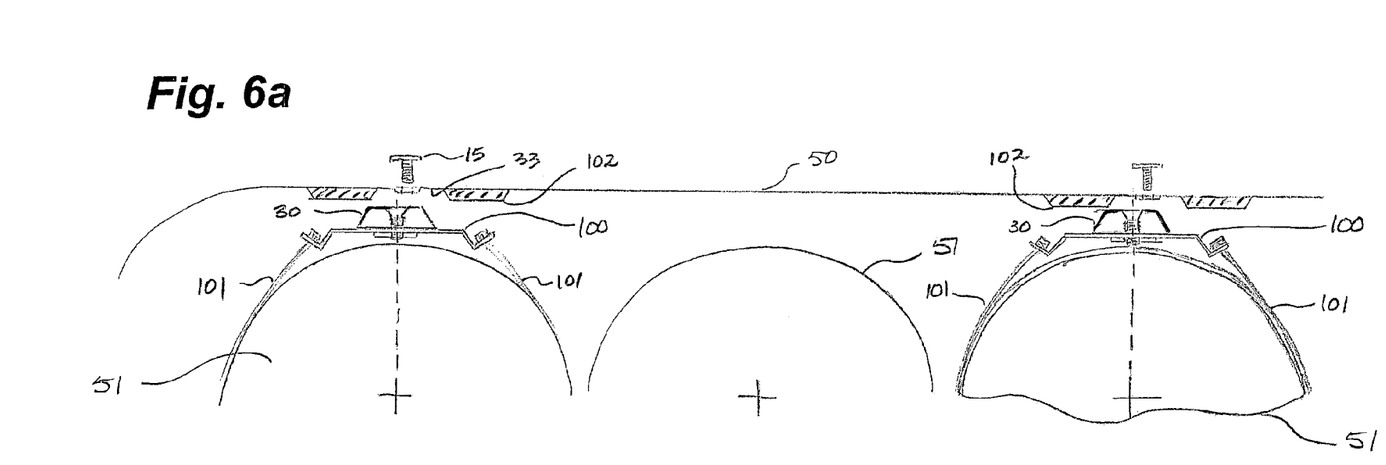
FIG. 6a illustrates alignment of the locating cone on the brackets in a donut shaped depression on a roof structure during mounting.
Figure 6B:
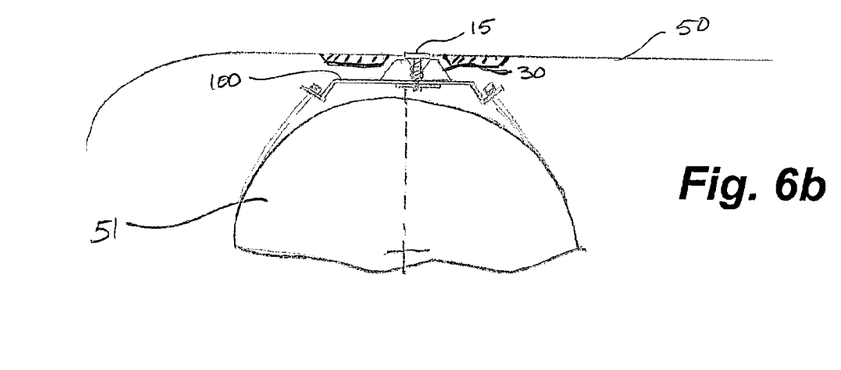
FIG. 6b illustrates an aligned locating cone and donut after attachment of the roof, the locating cone having been laterally displaced on the planar alignment surface of the bracket.

As shown in FIGS. 3 4 and 5, preferably, the saddle mount 12 of each bracket 100 used in the preferred embodiment of the system is formed having an arcuate base plate 103 positioned below and spaced away from the planar alignment surface 21. The arcute base plate 103 is connected at opposing ends 19,20 of the bracket 100. The first and second ends 19,20 of the bracket 100 are angled away from the base plate 103 to permit attachment to the belly mount straps 101. The angled first and second ends 19,20 are strengthened by the addition of reinforcements 104. A bolt hole 105 is formed in each of the angled first and second ends 19,20 through which a socket cap screw 106 connected to a strap pin 107 is passed. Opposing ends 108, 109 of a strap assembly 101 are passed over each of the strap pins 107. A rubber strap 110 is positioned beneath the arcuate base plate 103 and a separate rubber strap 111 is positioned beneath the belly mount strap 101 to prevent contact between the bracket 100 and strap 101 with the fuel cylinder 51 in accordance with safety requirements, such as NFPA52 standards, to prevent abrasion. The socket cap screws 106 are fastened in the bolt holes 105 by self-aligning washers 112 and flange nuts 113.

Figure 7:
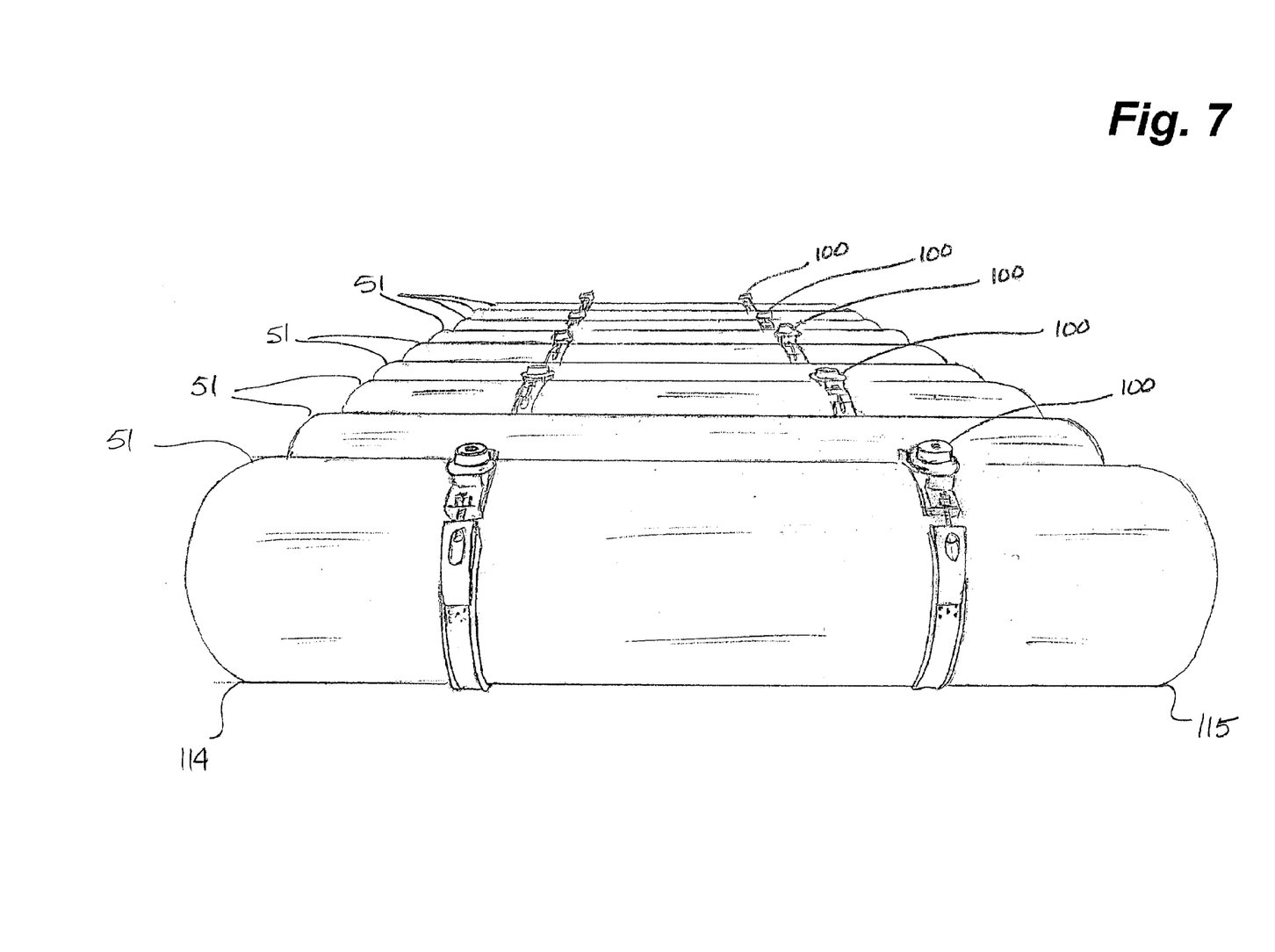
FIG. 7 is a perspective view of a bank of fuel cylinders having brackets according to FIG. 4 mounted to opposing ends of every other cylinder using belly mount straps.

As shown in FIG. 7, brackets 100 are typically attached to opposing ends 114, 115 of at least every other fuel cylinder 51 in a bank of fuel cylinders 51 positioned on the bus frame 52, to provide sufficient points of attachment for the roof to ensure structural integrity.

Thus use of a self-aligning bracket 10 of the present invention allows a roof 50 to be readily attached to a vehicle frame 52 without the necessity to manipulate the roof unduly or to attempt to create aligning holes for fasteners once the roof has been aligned.

The embodiments of the invention for which an exclusive property or privilege is claimed are defined as follows:

1. A self-aligning bracket, in combination with a planar structure, adapted for mounting the planar structure over a fixed structure, the planar structure having a fastener extending from an inner surface, the self-aligning bracket comprising:

a saddle mount having first and second ends adapted for attachment to the fixed structure, the planar alignment surface adapted to be spaced from a fixed structure and an oversized hole formed in the planar alignment surface;

coupling means for engaging the fastener extending from the planar structure, the coupling means extending through the oversized hole in the planar alignment surface;

an anchor connected to the coupling means, the anchor acting to retain the coupling means in the oversized hole;

first alignment means positioned on the inner surface of the planar structure adjacent the extending fastener; and second alignment means mounted about the oversized hole in the planar alignment surface of the saddle mount and moveable thereon in co-operating engagement with the first alignment means;

wherein the first alignment means moves the second alignment means attached to the coupling means laterally within the oversized hole to align the second alignment means with the first alignment means for engaging alignment of the fastener and coupling means.

2. The self-aligning bracket as described in claim 1 wherein actuation of the fastener in the coupling means causes the anchor and the second alignment means to tighten the planar surface to the fixed structure.

3. The self-aligning bracket as described in claim 1 wherein the fastener is a threaded fastener and the coupling means is a tubular fastener having a threaded bore for engaging the threaded fastener.

4. The self-aligning bracket as described in claim 1 wherein the anchor is an oversized washer, sized so as to span the oversized hole when the coupling means is displaced maximally therein.

5. The self-aligning bracket as described in claim 4 wherein the washer is at least twice the diameter of the oversized hole less a diameter of the coupling means located therein.

6. The self-aligning bracket as described in claim 5 wherein the washer is threaded.

7. The self-aligning bracket as described in claim 5 wherein the coupling means is a tubular fastener having a first end threaded for engaging the washer.

8. The self-aligning bracket as described in claim 1 wherein the second alignment means is a shaped locating block having a bore through which a tubular fastener extends.

9. The selfaligning bracket as described in claim 8 wherein the locating block is frustoconical in shape.

10. The self-aligning bracket as described in claim 1 wherein the first alignment means is a circular depression formed about the fastener on the inner surface of the planar structure.

11. The self-aligning bracket as described in claim 8 wherein the tubular fastener further comprises a shaped head for engaging a shaped opening to the bore in the locating block to permit co-rotation of the coupling means and the locating block causing the anchor and the locating block to move together and tighten on the saddle mount as the fastener is actuated.

12. The self-aligning bracket as described in claim 3 wherein the anchor is retained to the tubular fastener by a cotter pin.

13. The self-aligning bracket as described in claim 1 wherein the saddle mount further comprises an arcuate base plate attached between the first and second ends.

14. The self-aligning bracket as described in claim 13 wherein the saddle mount is adapted for mounting to a fuel cylinder and further comprises:
   bolt holes formed in each of the first and second ends adapted for attachment to opposing ends of a belly mount strap extending around the fuel cylinder; and
   wherein the first and second ends are angled.

15. A system adapted for mounting a planar roof structure to a vehicle frame having a plurality of faxed fuel cylinders mounted thereon, the system comprising a planar roof struture:
   a plurality of self-aligning brackets adapted for attachment to at feast some of the fuel cylinders; and
   a plurality of corresponding fasteners and alignment means extending from an inner surface of the planar roof structure;
   wherein each of the self-aligning brackets independently aligns with a corresponding alignment means on the planar roof struture and engages a corresponding fastener therein.

16. The system as described in claim 15 wherein the plurality of self-aligning brackets are attachable at opposing ends of the at least some of the fuel cylinders.

17. The system as described in claim 16 wherein the plurality of self-aligning brackets are attachable to opposing ends of every other fuel cylinder.

18. The system as described in claim 15, wherein the self-aligning bracket comprises:
   a saddle mount having first and second ends adapted for attachment to the at least some of the plurality of fixed fuel cylinders, a planar alignment surface adapted to be spaced from the at least some of the plurality of fixed fuel cylinders and having an oversized hole formed in the planar alignment surface;
   coupling means adapted for engaging the fastener extending from the planar roof structure, the coupling means extending through the oversized hole;
   an anchor connected to the coupling means, the anchor acting to retain the coupling means in the oversized hole;
   first alignment means adapted for positioning on the inner surface of the planar roof structure adjacent the extending fastener; and
   second alignment means mounted about the oversized hole in the planar alignment surface of the saddle mount and moveable thereon in co-operating engagement with the first alignment means;
   wherein the first alignment means moves the second alignment means attached to the coupling means laterally within the oversized hole to align the second alignment means with the first alignment means for engaging alignment of the fastener and coupling means.

19. The system as described in claim 18 wherein actuation of the fastener in the coupling means causes the anchor and the second alignment means to tighten the planar roof structure to the at least some of the fixed fuel cylinders.

20. The system as described in claim 19 wherein the coupling means is a tubular fastener having a threaded bore for engaging one of the plurality of fasteners extending from the planar roof structure; and
   wherein the fastener is a threaded fastener.

21. The system as described in claim 19 wherein the anchor is an oversized washer, sized so as to span the oversized hole when the coupling means is displaced maximally therein.

22. The system as described in claim 21 wherein the washer is at least twice the diameter of the oversized hole less a diameter of the coupling means located therein.

23. The system as described in claim 22 wherein the washer is threaded.

24. The system as described in claim 20 wherein the tubular fastener further comprises a first end threaded for engaging a washer.

25. The system as described in claim 19 wherein the second alignment means is a shaped locating block having a bore through which a tubular fastener extends.

26. The system as described in claim 25 wherein the locating block is frustoconical in shape.

27. The system as described in claim 19 wherein the second alignment means is a circular depression formed about the fastener on the inner surface of the planar roof structure.

28. The system as described in claim 25 wherein the tubular fastener further comprises has a shaped head for engaging a shaped opening to the bore in the locating block to permit co-rotation of the coupling means and the locating block causing the washer and the locating block to move together and tighten on the saddle mount as the fastener is actuated.

29. The system as described in claim 20 wherein the anchor is retained to the tubular fastener by a cotter pin.

30. The system as described in claim 19 wherein the saddle mount further comprises an arcuate base plate attached between the first and second ends.

31. The system as described in claim 30 wherein the saddle mount is adapted for mounting to a fuel cylinder and further comprises:
   bolt holes formed in each of the first and second ends adapted for attachment to opposing ends of a belly mount strap extending around the fuel cylinder; and
   wherein the first and second ends are angled.

* * * * *